(12) United States Patent
Oliver et al.

(10) Patent No.: US 8,043,080 B2
(45) Date of Patent: Oct. 25, 2011

(54) VACUUM RAISING IN A FLUID PERMEABLE MOULD OF FOODSTUFF

(75) Inventors: Louise Oliver, Slough (GB); Kristina Williamsson, Slough (GB); Micheal Zietek, Slough (GB)

(73) Assignee: Mars Incorporated, McLean, VA (US)

( * ) Notice: Subject to any disclaimer, the term of this patent is extended or adjusted under 35 U.S.C. 154(b) by 63 days.

(21) Appl. No.: 12/329,272

(22) Filed: Dec. 5, 2008

(65) Prior Publication Data

US 2009/0274813 A1 Nov. 5, 2009

Related U.S. Application Data

(63) Continuation of application No. 11/916,930, filed as application No. PCT/GB2006/002152 on Jun. 12, 2006, now abandoned.

(30) Foreign Application Priority Data

Jun. 10, 2005 (GB) .................................. 0511868.2

(51) Int. Cl.
*B29C 61/04* (2006.01)
(52) U.S. Cl. ............. 425/74; 426/512; 426/514; 425/85
(58) Field of Classification Search ............. 425/84–86, 425/73, 74; 162/221–228; 426/512–515
See application file for complete search history.

(56) References Cited

U.S. PATENT DOCUMENTS

| | | | |
|---|---|---|---|
| 1,391,918 A | 9/1921 | Thompson | |
| 3,018,540 A * | 1/1962 | Chavannes | 29/895.3 |
| 3,082,479 A * | 3/1963 | Chupa | 249/135 |
| 3,798,337 A | 3/1974 | Abalo | 426/279 |
| 3,865,532 A | 2/1975 | Sakuma | 425/405 R |
| 3,919,446 A * | 11/1975 | Smarook | 425/812 |
| 3,989,853 A | 11/1976 | Forkner et al. | 426/305 |
| 4,104,405 A | 8/1978 | Forkner | 426/94 |
| 6,149,772 A * | 11/2000 | Rasmussen | 162/383 |
| 6,190,151 B1 * | 2/2001 | Hunt | 425/80.1 |
| 6,582,562 B2 * | 6/2003 | Gale et al. | 425/423 |
| 7,074,302 B2 * | 7/2006 | Renck et al. | 162/223 |

FOREIGN PATENT DOCUMENTS

| | | |
|---|---|---|
| CH | 528873 | 10/1972 |
| EP | 0 422 883 A1 | 4/1991 |
| FR | 2572899 | 5/1986 |
| GB | 577994 | 9/1943 |
| GB | 1305520 | 7/1971 |
| WO | 02/37979 | 5/2002 |
| WO | 2005/002352 | 1/2005 |

* cited by examiner

*Primary Examiner* — Richard Crispino
*Assistant Examiner* — Thukhanh Nguyen
(74) *Attorney, Agent, or Firm* — Fitzpatrick, Cella, Harper & Scinto

(57) ABSTRACT

A vacuum raising apparatus for the production of an expanded foodstuff is disclosed, comprising a fluid permeable mould for constraining the foodstuff. The permeability of the mould is substantially uniform throughout so that during vacuum raising fluids from the foodstuff can escape uniformly through the entirety of the mould. The invention also provides a method of vacuum raising a foodstuff comprising constraining an unraised foodstuff within such a mould according to and subjecting the foodstuff within the mould to heat under vacuum.

10 Claims, 3 Drawing Sheets

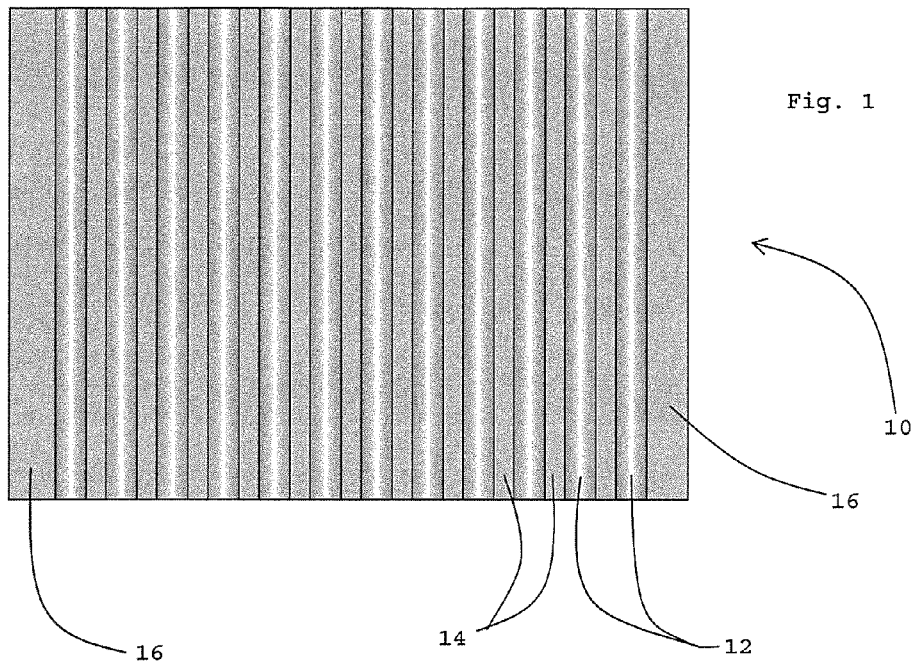
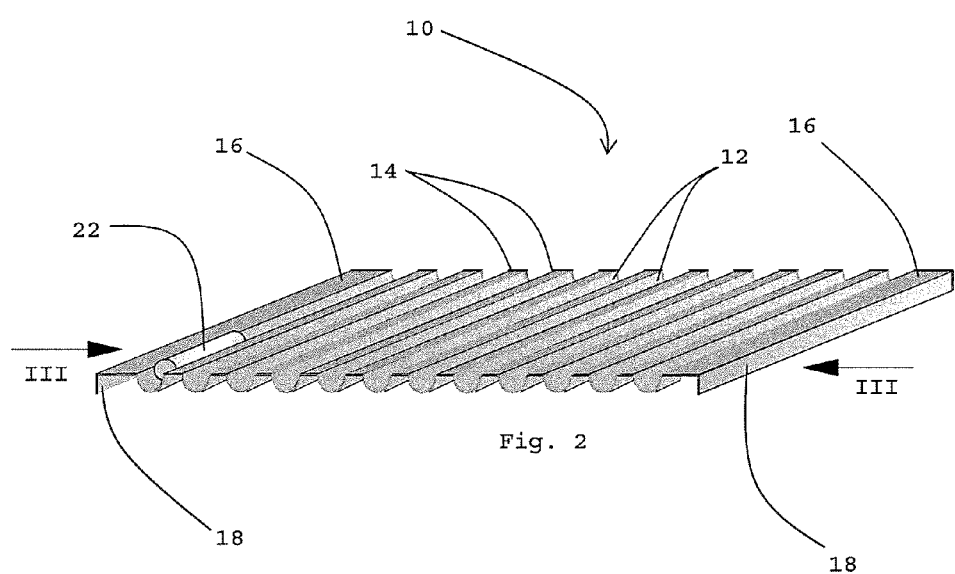

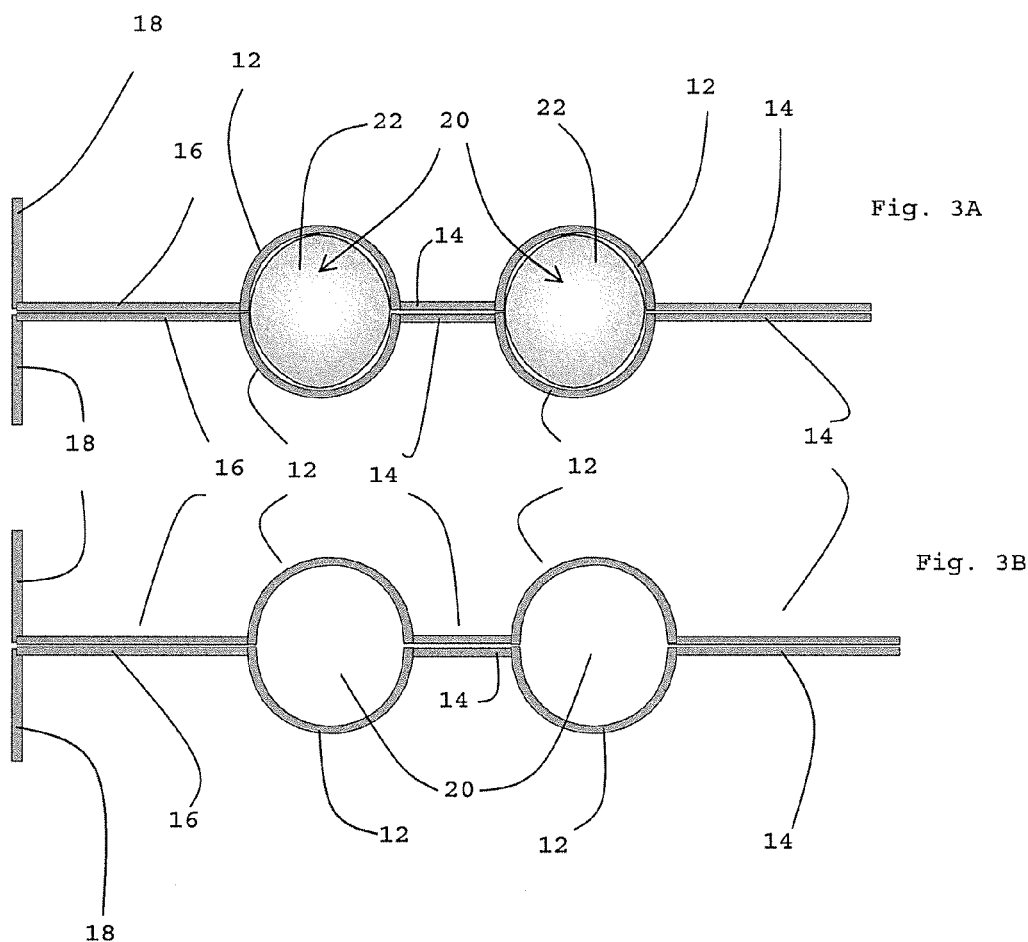

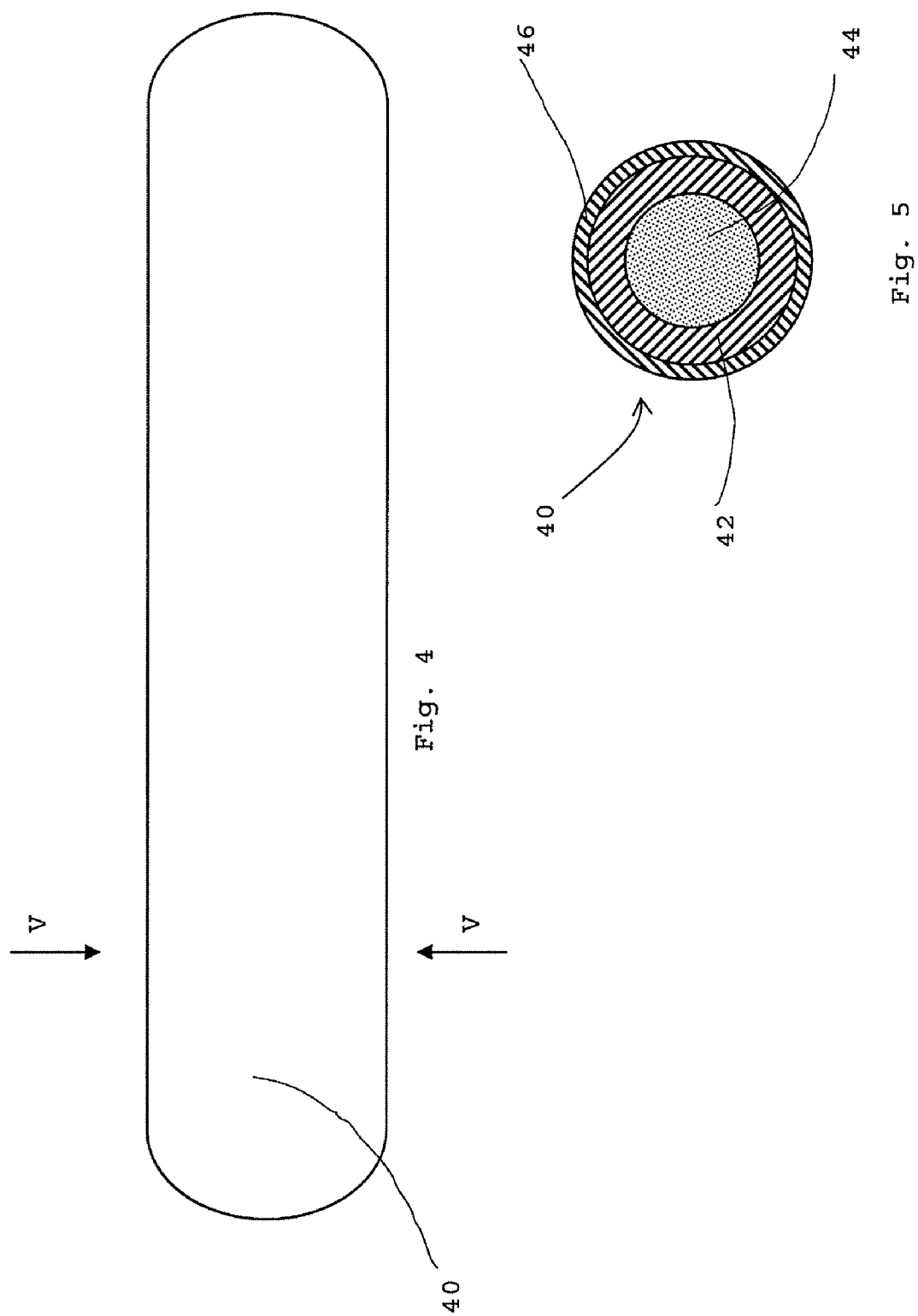

VACUUM RAISING IN A FLUID PERMEABLE MOULD OF FOODSTUFF

CROSS REFERENCE TO RELATED APPLICATION

This application is a continuation of Application No. 11/916,930, filed Dec. 7, 2007, which is a U.S. National Stage Under 35 U.S.C. 371 of International Application No. PCT/GB2006/002152, filed Jun. 12, 2006, and claims benefit of the filing date of that application, and priority benefit of the filing date of Great Britain patent application no. 0511868.2, filed Jun. 10, 2005. The entire disclosures of the prior applications are incorporated herein by reference.

The present invention relates to the production of a vacuum raised foodstuff, in particular a vacuum raised confectionery product.

BACKGROUND OF THE INVENTION

In the production of human and animal foodstuffs it is known to use edible fats as lubricants to improve the mouth feel of foodstuffs, such as confectionery. Such fats can be introduced in the form of so called cremes, which may or may not contain dairy product, but which contain fat at about 25% to 45% and usually flavour and sweetening agents. Hardening of the fat content may set cremes of this type. When eaten by the consumer, the fat melts resulting in the characteristic mouth feel.

Some foodstuffs, such as confectionery products including substantial pieces of set expanded sugar based honeycomb confectionery, benefit from the inclusion of cremes containing fats, as they improve the eating characteristics of the honeycomb confectionery. The fats may be dairy or non-dairy or a mixture. However conventional cremes melt and liquefy immediately they enter the consumer's mouth and may not be available throughout the time over which the consumer is chewing the honeycomb. Further, although it is desirable to have the fat available throughout the chewing of the honeycomb, it is not desirable for the confectionery to have a high fat content or to include fat which does not readily melt in the mouth and so gives a waxy mouthfeel. An example of such a product is disclosed in U.S. Pat. No. 4,707,374.

WO-A-2005002352 discloses an aerated fat based including relatively large bubbles (0.5 mm to 3 mm in diameter). Aeration is achieved by introducing pressurised gas into the liquid fat and whipping the fat.

If an expanded confectionery products are vacuum raised using conventional apparatus to create light, foamed texture, products which are variable in size and non-uniform in texture and in particular, moisture content may be produced. This can be undesirable, since consumers of branded foodstuffs expect uniformity and consistency of the products.

The use of moulds during the vacuum raising process has been suggested in order to constrain the products as they expand, thereby making products of a more uniform size and shape. However, the use of moulds can detrimentally affect the raising process since as well as constraining the expanding product, the mould also restricts the passage of fluids out of the product. The escape of fluids, in particular moisture, from the expanding product is an essential part of the raising process. As a result of the restriction, the length of time which the product must remain under vacuum before the required levels of fluids have escaped is unacceptably long, making the process unsuitable for a large scale production line.

An additional problem may be that, although the average moisture content can be controlled by varying the time that the product is left in the vacuum oven, the presence of the mould means that moisture is lost unevenly throughout the product, resulting in a product with non-uniform moisture content and texture.

U.S. Pat. No. 3,989,853 discloses a flexible pouch in which a loose foodstuff such as popcorn can be heated under vacuum. The pouch has vents at one end. After expansion, the vents can be sealed so that the pouch provides a container for the foodstuff.

SUMMARY OF THE INVENTION

According to a first aspect of the invention there is provided vacuum raising apparatus for the production of an expanded foodstuff comprising a fluid permeable mould for constraining the foodstuff, the permeability of the mould being substantially uniform throughout so that during vacuum raising fluids from the foodstuff can escape uniformly through the entirety of the mould.

The mould constrains the product contained within it during the vacuum raising process and is thereby able to produce expanded products of consistent and uniform size and shape. The permeability of the mould allows fluids to escape from the product during the vacuum raising process, which is essential for the production of a product of the desired consistency and texture. In particular, the permeability of the mould ensures that moisture can be lost evenly over the volume of the product within the mould.

Permeability of the mould may be achieved, for example by the presence of a plurality of pores. Pore size should be sufficiently small that the material contained within the mould is unable to escape through the pores, but at the same time should not be so small that the pores become blocked and require cleaning between uses. For use in the vacuum raising of confectionery products, the mould preferably has pores up to about 3 mm in diameter, more preferably about 2 mm in diameter. Preferably, the pores are regularly spaced over the mould. Also preferably, all the pores are of the same diameter. The pores may be made in an inherently non porous material of which the mould is made or the mould may be of an inherently porous material.

Preferably, the mould cavity is cylindrical in shape. Preferably the mould comprises a plurality of mould cavities. Preferably, the mould comprises a permeable sheet of alternating flats and troughs. Preferably, the mould comprises two portions which cooperate to define one or mould cavities. In a preferred embodiment, each mould portion comprises alternating flats (or ridges) and troughs along the mould portion; when the portions cooperate to form mould cavities, the flats (or ridges) on one portion contact the flats (or ridges) on the other portion to define elongate mould cavities which can receive more than one charge of material to be moulded. The inner surfaces of the mould may have a layer of a non stick material on them.

Moulds according to the invention may have open portions. For example, in the case of elongate moulds, the longitudinal walls will be present (and permeable) but the mould need not have end walls. The permeability of the walls may be such that fluids can escape as readily, or almost as readily, through the walls as through the open ends.

In a second aspect the invention provides a method for vacuum raising a foodstuff comprising: constraining an unraised foodstuff within a mould according to the first aspect of the invention and subjecting the foodstuff within the mould to heat under vacuum.

The second aspect of the invention also provides a method of making a vacuum raised confectionery product comprising: forming a first edible component, forming a second edible component comprising a fat liquid at body temperature and a protein, coextruding the first component around the second component to form a layer of the first component on a core of the second component, constraining the extruded product within a mould, the permeability of the mould being substantially uniform throughout so that during vacuum raising fluids from the foodstuff can escape uniformly through the entirety of the mould; and heating the extruded product within the mould under vacuum. Preferably, the mould is according to the first aspect of the invention.

Preferably, the foodstuff or, if more than one component is present in the mould, at least one of and more preferably all the components forming the foodstuff, foam during the vacuum raising step. In preferred methods of the invention, the product is a substantially rigid foamed shell of the first component around a foamed core of the second component, which may be a foamed creme or other soft component.

Preferably, the heating step is carried out at a temperature of between 90° C. and 140° C., preferably between 100° C. and 110° C. It is preferred that the components in the mould reach a temperature of between 40° C. and 90° C., more preferably between 80° C. and 90° C. Preferably, the heating step is carried out at a pressure of no more than about 50 mbar, more preferably about 35 mbar.

In preferred methods according to the invention the temperature is maintained substantially uniform around the mould. It has been found that a temperature differential across the mould can result in a foam having non-uniform bubble sizes and/or distribution. In the case of a multi component foodstuff, uneven temperature around the mould may result in the relative positions of the components changing during vacuum raising.

Preferably, the first component forms a rigid edible material after the heating step. Particularly preferably, the first component forms an expanded sugar and protein matrix after the heating step.

Preferably, the second component contains fat and has a fat content of at least 15%, more preferably at least 25%. Preferably, the fat in the second component has a solids content at 20° C. of no more than 35%, and, preferably, a solids content at 30° C. of no more than 7%.

Preferably, the second component contains protein and has a protein content of at least 2%, preferably between 4% and 6%.

Preferably, the second component contains sugar and has a sugar content of up to 40% sugar, preferably between 30% and 40% sugar. Also preferably, the sugar is sucrose.

The extruded product may be cut into discrete lengths prior to the heating step. The product of the heating step may be coated with an edible coating, such as chocolate.

BRIEF DESCRIPTION OF THE DRAWINGS

The invention will now be described by way of example with reference to the drawings, in which:

FIG. 1 is a schematic view of one half of a mould according to a first embodiment of the first aspect of the invention;

FIG. 2 is a perspective view of the half mould of FIG. 1;

FIG. 3A is a partial cross sectional view of a complete mould on the line III-III of FIG. 2, with a representative charge in the mould cavities;

FIG. 3B is a partial cross sectional view of a complete mould on the line III-III of FIG. 2, empty;

FIG. 4 is a schematic elevation of a confectionery product made using a method according to the second aspect of the invention; and FIG. 5 is a cross sectional view along line V-V of FIG. 4.

DETAILED DESCRIPTION OF THE INVENTION

The half mould 10 shown in FIGS. 1 and 2 comprises alternating troughs 12 and flats 14. The troughs 12 are of semi circular cross section. The flats 16 at the lateral edges of the half mould 10 are wider than the flats 14 between the troughs 12. Support flanges 18 extend downward from the free edges of the lateral edge flanges 16 to support the mould on a surface.

The internal diameter of the troughs 12 is constant and between 13 mm and 15 mm. The half mould 10 is rectangular and between 400 mm and 450 mm in length (in the longitudinal direction of the troughs 12).

The other half mould is substantially identical to that shown in the drawings, although the support flanges 18 may be absent. When the half moulds 10 are brought together, the flats 14 on one half bear on the flats of the other half and the troughs 12 of each half form cylindrical section mould cavities 20 (FIGS. 3A and 3B) of constant internal diameter. The mould halves are of a stainless steel sheet of thickness between 0.5 mm and 2 mm having a plurality of 1.5 mm diameter pores through it. The pores are regularly spaced across the entire surface of each mould half.

In use, charges 22 of the unraised product (the primary product) are placed in the troughs 12 of one mould half 10. Each trough 12 can receive several charges 22, only one of which is shown in FIG. 2. The other mould half is placed on top; the mould halves may held in place by cooperating male and female structures, such as pins and holes, on the halves. The weight of the upper half will normally be adequate to hold the halves together adequately during vacuum raising, but if necessary the halves may be fixed together.

In some applications, it may be necessary to constrain only a part of the charge of primary product during vacuum raising, in which case the mould will be open over part of the surface of the charge. For example, the mould may consist of a single mould half 10.

The mould with the primary products in place is sealed inside a conventional vacuum oven for the raising process to take place. Once the desired moisture level of the products is obtained, the array of moulds is removed from the vacuum oven and the mould halves are dismantled to remove the raised, or expanded, product.

In order to prevent the raised product sticking to the inner surface of the stainless steel mould the inner surface of the stainless steel mould may be provided with a layer of non-stick material.

Use of a permeable mould according to the invention in the vacuum raising process provides expanded products with a light and even texture. The presence of the pores across the entire surface of the mould enables moisture to be lost relatively quickly from the product during the vacuum raising process. The even distribution of the pores over the mould surface allows the moisture to be lost evenly, avoiding the creation of a moisture gradient along the length of the final raised product.

The charges of primary product expand radially to fill the mould cavities 20; the charges are spaced in the cavities so that they do not impinge on each other as a result of longitudinal expansion. If necessary, the cavities can be formed with end walls so that each cavity takes a single charge, which is completely constrained during vacuum expansion; in that case, it is preferred that all the walls are porous or otherwise permeable.

It will be appreciated that the size of the mould will depend on the size of the foodstuff to be raised. In this example, the size of the mould corresponds to the dimensions of a conventional sized chocolate bar; however, moulds of similar construction but differing dimensions can be used if products of a different size or shape are required. The thickness of the mould is not critical to its function and therefore, provided the mould is rigid, the thickness may typically be between a thin mesh of 0.5 mm thickness and a metal sheet of 2 mm thickness; thicker or thinner material can be used.

It will also be appreciated that a mould of similar construction to that described can produce different shaped products, for example products with a rectangular cross section, by provision of troughs of appropriate cross section.

It will be appreciated that the number of cavities in the mould can be chosen according to the size of the vacuum oven being used. The arrangement of the moulds in the array may also be varied.

The mould of the described embodiment comprises two identical halves, however, it will be appreciated that the mould can be formed from a single tube, or an array of tubes, or from portions having troughs of different cross sections, for example the portions may be two thirds and one third respectively of a circular cross section, rather than halves as in the example described.

It will be appreciated that moulds according to the invention can be constructed from materials other than stainless steel, such as different metals, including metal mesh and sintered metal, and formed plastics, such as polytetrafluoroethylene (PTFE), polyetheretherketone (PEEK) and nylon mesh. The material may be a non-stick material, or the inner surface of the mould may be provided with a layer of non-stick material.

It will also be appreciated that different size pores may be appropriate for different products or vacuum conditions. The pores may be drilled into the sheet of material for making the mould or an inherently porous material such as sintered metal may be used.

The pores of the mould shown in FIGS. 1 to 3 are identical in size and are evenly spaced. However, it will be appreciated that pores of varying sizes and distributions may be used, provided the resultant permeability of the mould is such that fluids can escape evenly through the entire body of the mould.

The moulds of the invention may be used in the production of expanded foodstuffs by a vacuum raising process, as already described. The primary products to be raised are placed within the mould cavities and the mould is sealed inside a vacuum oven until the desired moisture content of the product is achieved. The attributes of the final raised product are affected by a number of parameters relating to the conditions inside the oven, in particular the pressure and temperature. This will be illustrated below with reference to a specific product. In order to ensure even distribution and size of bubbles in the raised, foamed product, it is preferred that the temperature is around the mould is substantially uniform.

The method of vacuum raising described above may form part of a process for producing a confectionery product 40 of the type shown in FIGS. 4 and 5, which comprises a generally cylindrical shell 42 and a central core 44 of a foamed component comprising a mixture of fat and protein. The cylindrical shell 42 is rigid and crunchy and is coated with a layer of chocolate 46.

The confectionery product can be made as follows.
1. The core:
   For the foamed component of the core, the following ingredients were mixed in a Hobart mixer with a paddle for 1 minute, the mixing vessel was scraped down and the mixture mixed for a further 30 s:

| | |
|---|---|
| skimmed milk powder | 59% |
| icing sugar | 20% |
| Karlshamns Akoliq NT M fat | 21% |
| | 100% |

The mixture was refined to give a milled powder of about 30 μm diameter particles.

The milled powder and other ingredients as follows were mixed in a Hobart mixer with a paddle for 30 s, the mixing bowl was scraped down and the mixture mixed for a further 5 s to give a creme:

| | |
|---|---|
| milled powder | 71% |
| Karlshamns Akoliq NT M fat | 23% |
| cocoa mass | 6% |
| | 100% |

The resulting creme was held overnight at 18° C. to firm up then whipped with a paddle in a Hobart mixer to aerate the creme to 0.94 g/cm$^3$ density.

2. For the outer cylinder:
   A semi plastic composition was made according to the following recipe:

| | |
|---|---|
| Skimmed milk powder | 30% |
| Malt extract | 20% |
| Spray dried glucose | 50% |
| | 100% |

The water content (including water from the dry ingredients) was adjusted to 9% and the ingredients mixed in a Z blade type mixer to form a semi plastic composition.

3. The creme and the semi plastic composition were coextruded through concentric dies to produce a continuous cylinder of the semi plastic composition filled with the creme, which was then cut to 14 cm lengths by a guillotine. A rotary bar press was used for the coextrusion; the semi plastic composition and the creme were each forced through a manifold under pressure. The creme was worked at room temperature in this stage and the semi plastic composition was worked at between 20° C. and 30° C. to give a workable viscosity. The cylinder was extruded onto a takeoff belt running at between 110% and 120% of the speed of production of the cylinder to stretch the cylinder. The coextruder may have multiple concentric dies to extrude more than one cylinder.

4. The cut lengths of creme filled cylinder were each introduced into one of an array of permeable moulds of the type shown in FIG. 1. With the dough cylinders in place inside the moulds, the array was sealed inside a vacuum oven (Heraeus Instruments, Vacutherm model no. VT 6130 Laboratory vacuum oven) and the dough cylinders baked for between 5 minutes and 30 minutes at an oven temperature of between 60° C. and 150° C. and at a pressure of up to 50 mbar. Preferred operating conditions are a pressure of 35 mbar and a temperature between 100° C. and 110° C. The filled cylinder should achieve an internal temperature of between 40° C. and 90° C.

The outer semi plastic composition and the inner aerated creme expanded during vacuum baking to give an expanded cylinder around a foamed creme core.

5. The expanded product of step 4 was removed from the mould and coated in chocolate by enrobing (coating may also be achieved by moulding or another coating technique) to give the final confectionery product.

The final product had an even texture which is light, dry, crisp and friable.

As noted above, the attributes of the final expanded product are affected by the pressure and temperature inside the oven during the vacuum raising process and the texture of the product can therefore be predetermined to a certain extent by altering the conditions. Table 1 shows the effect of increasing the oven pressure on the internal product temperature during the vacuum raising process and the moisture content of the final product. Tests to obtain the results shown in Table 1 were carried out using a two piece stainless steel mould with drilled holes of 3 mm diameter, and the samples were left inside the vacuum oven for 27 minutes.

TABLE 1

| Oven pressure | Oven platen temperature | Product temperature at 5 minutes | Product temperature at 25 minutes | Product moisture content |
|---|---|---|---|---|
| 15 torr (20 mbar) | 100° C. | 46.3° C. | 65.0° C. | 2.8% |
| 51 torr (68 mbar) | 100° C. | 53.7° C. | 70.0° C. | 3.2% |
| 80 torr (106 mbar) | 100° C. | 67.0° C. | 74.7° C. | 4.1% |

It can be seen that although the oven platen temperature was constant throughout the tests, the product temperature increases with increasing pressure and time left in the oven.

The product temperature influences the viscosity of the product, so that as the oven pressure and accordingly the product temperature increase, the viscosity will decrease. A lower viscosity dough will resist the expansion of bubbles to a lesser extent, therefore allowing them to grow larger and coalesce. This means that at higher oven pressures, a product with a more open bubble structure can be produced. The final product is more brittle and glass like and has a higher degree of tooth packing. The results also show that the moisture level of the dough increases with increasing pressure.

In order to ensure even distribution and size of bubbles in the raised, foamed product, it is preferred that the temperature is around the mould is substantially uniform. It has been found that a temperature differential across the mould can result in a foam having non-uniform bubble sizes and/or distribution. In the case of a multi component foodstuff, uneven temperature around the mould may result in the relative positions of the components changing during vacuum raising.

It has also been found that the colour of the dough darkens with increasing pressure since the higher product temperature brought about by the increased pressure will increase the rate of browning reactions Table 2 shows the effect of increasing the oven temperature on the internal product temperature during the vacuum raising process and the moisture content of the final product. Tests to obtain the results shown in Table 2 were carried out using a two piece stainless steel mould with drilled holes of 3 mm diameter and the samples were left inside the vacuum oven for 27 minutes.

TABLE 2

| Oven platen temperature | Oven pressure | Product temperature at 5 minutes | Product temperature at 5 minutes | Product moisture content |
|---|---|---|---|---|
| 70° C. | 20 mbar (15 torr) | 42.4° C. | 48.9° C. | 4.0% |
| 100° C. | 20 mbar (15 torr) | 43.9° C. | 63.4° C. | 2.8% |
| 127° C. | 20 mbar (15 torr) | 67.9° C. | 92.8° C. | 1.2% |

It can be seen that increasing the oven platen temperature results in an increased product temperature, with the same effects on the texture of the product as set out increasing the oven temperature also results in a reduction of the moisture content and tooth packing of the product.

The results in Tables 1 and 2 clearly illustrate that it is possible to use similar methods to produce confectionery products of differing appearance and texture by altering the pressure and temperature conditions inside the vacuum oven during the vacuum raising process. Different values of pressure and temperature can be applied to generate the structure desired for the particular product in question.

The invention claimed is:

1. Vacuum raising apparatus for the production of an expanded foodstuff comprising: a vacuum oven; and a fluid permeable mould for constraining the foodstuff, wherein the fluid permeable mould is sealed inside the vacuum oven and wherein the permeability of the mould is substantially uniform throughout so that during vacuum raising fluids from the foodstuff can escape uniformly through the entirety of the mould, wherein the mould comprises a plurality of mould cavities and the mould comprises a permeable sheet of alternating troughs and flats.

2. Vacuum raising apparatus according to claim 1, wherein the mould comprises two or more separable portions.

3. Vacuum raising apparatus according to claim 1, wherein the mould is made of an inherently porous material.

4. Vacuum raising apparatus according to claim 1, wherein the mould has pores having a diameter of up to about 3 mm.

5. Vacuum raising apparatus according to claim 1, wherein the mould comprises regularly spaced, similarly sized pores having a diameter of up to about 3 mm.

6. Vacuum raising apparatus according to claim 1, wherein the mould comprises a cylindrical mould cavity.

7. Vacuum raising apparatus according to claim 1, wherein the mould has a thickness in a range of 0.5 mm to 2 mm.

8. Vacuum raising apparatus according to claim 1, wherein the mould is constructed of stainless steel, metal mesh, sintered metal, or formed polytetrafluoroethylene, formed polyetheretherketone, or nylon mesh.

9. Vacuum raising apparatus according to claim 1, wherein the mould comprises an inner surface provided with a layer of non stick material.

10. Vacuum raising apparatus for the production of an expanded foodstuff comprising:
a vacuum oven; and
a fluid permeable mould for constraining the foodstuff comprising two mould halves, wherein the fluid permeable mould is sealed inside the vacuum oven, and wherein the permeability of the mould is substantially uniform throughout the two mould halves so that during vacuum raising fluids from the foodstuff can escape uniformly through the entirety of the mould, wherein the mould comprises a plurality of mould cavities and the mould comprises a permeable sheet of alternating troughs and flats.

* * * * *

UNITED STATES PATENT AND TRADEMARK OFFICE
CERTIFICATE OF CORRECTION

| | | |
|---|---|---|
| PATENT NO. | : 8,043,080 B2 | Page 1 of 2 |
| APPLICATION NO. | : 12/329272 | |
| DATED | : October 25, 2011 | |
| INVENTOR(S) | : Louise Oliver et al. | |

It is certified that error appears in the above-identified patent and that said Letters Patent is hereby corrected as shown below:

ON THE TITLE PAGE [56] REFERENCES CITED:

Foreign Patent Documents, "WO 02/37979 5/2002" should read --WO 2002/37979 5/2002--.

ON THE TITLE PAGE [75]:

Inventors: "Micheal Zietek," should read --Michael Ziatek,--.

ON THE TITLE PAGE [57] ABSTRACT:

Line 9, "according to" should be deleted.

IN THE SPECIFICATIONS:

COLUMN 1:

Line 26, "flavour" should read --flavor--;
Line 44, "WO-A-2005002352" should read --WO-A-2005/002352-- and
"based" should read --base--; and
Line 48, "an" should be deleted.

COLUMN 2:

Line 46, "mould" should read --more mould--.

COLUMN 3:

Line 63, "cross sectional" should read --cross-sectional--; and
Line 66, "cross sectional" should read --cross-sectional--.

Signed and Sealed this
Twenty-eighth Day of May, 2013

Teresa Stanek Rea
*Acting Director of the United States Patent and Trademark Office*

CERTIFICATE OF CORRECTION (continued)
U.S. Pat. No. 8,043,080 B2

COLUMN 4:

Line 4, "cross sectional" should read --cross-sectional--; and
    Line 8, "semi" should read --semi- --.

COLUMN 5:

Line 60, "is" (first occurrence) should be deleted.

COLUMN 6:

Line 28, "up" should read --up,--.

COLUMN 7:

Line 44, "glass like" should read --glass-like--;
    Line 56, "colour" should read --color--; and
    Line 59, "reactions" should read --reactions.--.